C. H. HAPGOOD.
SEPARATION OF OLEO AND STEARIN FROM FATS.
APPLICATION FILED MAY 20, 1920.
1,381,705.
Patented June 14, 1921.
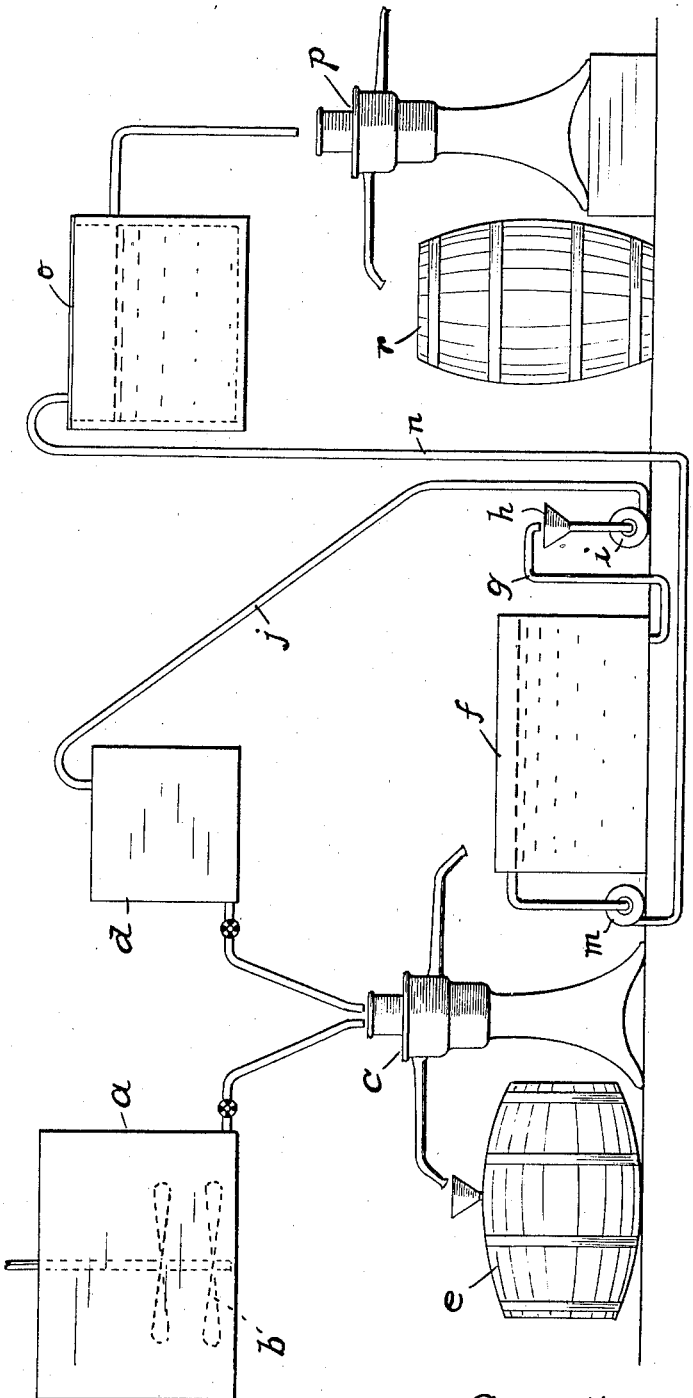
INVENTOR
Cyrus Howard Hapgood
BY
Frank S. Busser
ATTORNEY.
WITNESS:

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

SEPARATION OF OLEO AND STEARIN FROM FATS.

1,381,705.	Specification of Letters Patent.	Patented June 14, 1921.

Application filed May 20, 1920. Serial No. 382,699.

*To all whom it may concern:*

Be it known that I, CYRUS HOWARD HAPGOOD, a citizen of the United States, residing at Nutley, county of Essex, and State of New Jersey, have invented a new and useful Improvement in the Separation of Oleo and Stearin from Fats, of which the following is a full, clear, and exact description, reference being had to the accompanying drawings, which form a part of this specification.

The object of my invention is to treat fats to effect the separation of contained stearin and oleo. The present methods of treatment involve considerable time and much skilled labor. My new process dispenses with most of this labor, expedites the separation, and effects the separation with a maximum degree of thoroughness.

In describing my process I shall refer to the accompanying drawing, which is a diagram of the apparatus that I prefer to use. It will be understood, however, that the execution of my process is not limited to the employment of any particular apparatus.

It is necessary to carry out most of the process at a temperature which does not vary much from ninety degrees F. This can most conveniently be done by maintaining the room in which the process is conducted at a temperature of about ninety degrees F., thereby dispensing with any special heating or cooling of the materials undergoing treatment until the last stage of the process is reached, wherein a considerably higher temperature is required.

The fats to be treated are delivered to a mixing tank *a* containing a stirrer *b*. The constituents of the fat are principally oleo and stearin. The oleo starts to solidify at a temperature under ninety degrees F. The stearin starts to solidify at a temperature of about 140 degrees F., but it is necessary to reduce its temperature to approximately ninety degrees F. to completely solidify it and bring it into the crystallized condition desired. If the temperature is much lower than ninety degrees F., solidification of the oleo will commence, whereas if the temperature is much above ninety degrees the stearin will be in a partially liquid condition. It being desired to effect the separation while the oleo is liquid and the stearin in a crystalline condition, it will be understood that the specified temperature, or one very close to it, is a critical temperature, to which it is necessary to adhere if it is desired to carry out my process in the most preferable and advantageous way.

After the ingredients of the fat have been thoroughly mixed they are conveyed to a centrifugal separator *c*. The action of the separator will be to cause the heavier ingredient, the stearin, to be thrown out to the periphery, while the lighter liquid, the oleo, will be displaced inwardly toward the axis of the bowl. In order that the separator shall not act merely as a clarifier, a cushioning or carrier liquid is introduced to the separator to carry off the crystallized stearin. This cushioning liquid must be heavier than the oleo and is preferably also heavier than the stearin. An ideal liquid is water. Taking the specific gravity of water as 1.00, the stearin has a specific gravity of about .96 and the oleo a specific gravity of about .90. In the operation of the separator, the water will be forced against the periphery of the rotating bowl and be discharged through a suitably located outlet. The stearin will move out toward the periphery and be carried along the inner surface of the traveling cushion of water and thereby be carried out with the water. The lighter oleo, as above stated, will be displaced inwardly and be discharged through a separate outlet. The use of water or any appropriate liquid for sludging out solids from liquids in a centrifugal separator is known, one example of which is found in the Beach Patent, No. 1,158,959, issued November 2, 1915. The machine of the Beach patent is capable of use in my process, but I prefer to use a separator of a construction similar to that of the Snyder Patent, No. 1,283,343, issued October 29, 1918.

In the drawing, the water supply tank is shown at *d*. It is desirable to feed to the separator about as much water as there is stearin.

The oleo is discharged from the separator into a barrel or other appropriate receptacle *e*. The water and stearin are discharged into a tank *f*. In the tank *f* the water and stearin will tend to separate by gravity, the water sinking to the bottom, the stearin, with some water, floating on the top. I prefer to connect an upright pipe *g* to the bottom of the tank, the upper discharge end of the pipe being slightly below the level of the material in the tank, which continuously overflows through a pipe $k$, while the water continuously outflows from the pipe $g$, the principle of operation being the same as in the well known "Florence flask." The water outflowing from pipe $g$ discharges into a funnel $h$, whence, by means of a pump $i$, it is lifted through a pipe $j$ and discharged into the water tank $d$. The water from pipe $g$ may be carried off as waste, but this is uneconomical, as it is at a proper temperature for re-use.

The mixture of stearin and water outflowing through pipe $k$ is, by means of a pump $m$, forced through a pipe $n$ into a tank $o$, which is steam-jacketed to enable the material therein to be heated to a temperature of about 160 degrees F. It is desirable to elevate the material to this temperature to insure a complete liquefaction of the stearin. The temperature in tank $c$ should not be much below 160 degrees, nor should it be much above that temperature. Some separation of water and stearin will be effected, in tank $o$, by gravity. The mixture of stearin and water overflows from the top into another centrifugal separator $p$, where the two liquids will be separated and the stearin discharged into a barrel or other receptacle $r$.

This completes the process, which, as will be observed, is almost wholly automatic. The separation of oleo and stearin is clean, there is no waste of either ingredient, the operation is expeditious, and the labor is almost wholly merely of a supervisory character.

A very important advantage of my process is that the oleo and stearin are recovered in a dehydrated condition and therefore free of dirt and bacteria which would be carried over with any water. Hence these products may be stored for a substantial length of time at normal temperature without danger of decomposition.

While I have described and claimed the process as applied to the treatment of fats to separate therefrom oleo and stearin, my process is not limited thereto. It is obvious that any mixed ingredients having similar characteristics are, for the purposes of my process, equivalent materials; and, further, that the process is applicable to the separation of a mixture of any ingredients one of which it is practicable to convert to solid or crystalline condition preparatory to the first centrifugal separation and to a liquid condition preparatory to the second or final centrifugal separation.

Having now fully described my invention, what I claim and desire to protect by Letters Patent is:

1. The process of treating fats to separate the oleo thereof from the stearin thereof which comprises subjecting the fats and a liquid that is heavier than the oleo to centrifugal force and separately discharging the oleo and said heavier liquid and stearin, and subjecting said heavier liquid and stearin to centrifugal force to separate out the stearin.

2. The process of treating fats to separate the oleo thereof from the stearin thereof which comprises subjecting the fats to a temperature which is sufficiently high to maintain the oleo in a liquid condition and sufficiently low to insure the crystallization of the stearin, subjecting said ingredients in such condition, together with a cushioning liquid of appropriate specific gravity, to the action of centrifugal force to effect the separation and separate discharge of the oleo and the separate discharge of the stearin with said cushioning liquid, and separating the stearin from said liquid.

3. The process of treating fats to separate the oleo thereof from the stearin thereof which comprises subjecting the fats to a temperature which is sufficiently high to maintain the oleo in a liquid condition and sufficiently low to insure the crystallization of the stearin, subjecting said ingredients in such condition, together with a cushioning liquid of appropriate specific gravity, to the action of centrifugal force to effect the separation and separate discharge of the oleo and the separate discharge of the stearin with said cushioning liquid, heating the stearin mixed with said liquid to a temperature sufficient to liquefy the stearin, and subjecting said heated liquids to centrifugal force to effect their separation and separate discharge.

4. The process of treating fats to separate the oleo thereof from the stearin thereof which comprises subjecting the fats to a temperature which is sufficiently high to maintain the oleo in a liquid condition and sufficiently low to insure the crystallization of the stearin, subjecting said ingredients in such condition, together with a cushioning liquid of appropriate specific gravity, to the action of centrifugal force to effect the separation and separate discharge of the oleo and the separate discharge of the stearin with said cushioning liquid, effecting the separation of said liquid from said stearin in two successive operations, and re-utilizing the liquid separated from the stearin in the first operation as a cushioning liquid in the centrifugal separation of the oleo and the stearin.

5. The process of treating fats to separate the oleo thereof from the stearin thereof which comprises subjecting the fats to a temperature which is sufficiently high to maintain the oleo in a liquid condition and sufficiently low to insure the crystallization of the stearin, subjecting said ingredients in such condition, together with a cushioning liquid of appropriate specific gravity, to the action of centrifugal force to effect the separation and separate discharge of the oleo and the separate discharge of the stearin with said cushioning liquid, allowing settlement and separate outflow of said liquid and separate outflow of a mixture of stearin with said liquid, re-using said separately outflowing liquid as a cushioning liquid in said centrifuging operation, heating the outflowing mixture of stearin and liquid until the stearin is liquefied, and subjecting said heated liquids to centrifugal force to effect their separation.

6. The process of treating fats to separate the oleo thereof from the stearin thereof which comprises subjecting the fats to a temperature which is sufficiently high to maintain the oleo in a liquid condition and sufficiently low to insure the crystallization of the stearin, subjecting said ingredients in such condition, together with water, to the action of centrifugal force and separately discharging the water and stearin and the oleo, heating the stearin mixed with water to a temperature sufficiently high to liquefy the stearin, and subjecting the mixture of stearin and water to centrifugal force to effect their separation.

7. The process of treating fats to separate the oleo thereof from the stearin thereof which comprises subjecting the fats to a temperature which is sufficiently high to maintain the oleo in a liquid condition and sufficiently low to insure the crystallization of the stearin, subjecting said ingredients in such condition, together with water, to the action of centrifugal force and separately discharging the water and stearin and the oleo, allowing settlement and separate outflow of the water and separate outflow of stearin mixed with water, heating such mixture of stearin and water to a temperature sufficient to liquefy the stearin, and subjecting the stearin and water to centrifugal force to effect their separation.

8. The process of treating fats to separate the oleo thereof from the stearin thereof which comprises subjecting the fats to a temperature of approximately ninety degrees F. and subjecting them, together with a liquid that is heavier than the oleo, to centrifugal force and separately discharging the oleo and said heavier liquid and stearin, allowing said liquid to partially separate out by gravity, leading off the mixture of liquid and stearin and subjecting it to a temperature sufficient to liquefy the stearin, and subjecting the mixed liquids to centrifugal force and separately discharging the stearin.

9. The process of treating fats to separate the oleo thereof from the stearin thereof which comprises subjecting the fats and water to centrifugal force, separately discharging the oleo and the water and stearin, separating out a part of the water, conducting the specified operations at a temperature of approximately ninety degrees F., raising the temperature of the stearin and the water not separated therefrom to approximately 160 degrees F., and subjecting them to centrifugal force to effect their separation.

10. The process of separating a mixture of ingredients the heavier of which solidifies at a higher temperature, which comprises subjecting the mixture to a temperature which will maintain the lighter ingredient liquid and the heavier ingredient solid, subjecting said ingredients, at such temperatures and in such condition, together with a cushioning liquid of appropriate specific gravity, to the action of centrifugal force to effect the separation and separate discharge of the lighter ingredient and the separate discharge of the heavier ingredient with said cushioning liquid, heating the mixture of said heavier ingredient and cushioning liquid to a temperature sufficient to liquefy said heavier ingredient, and subjecting the heated mixture to centrifugal force to effect the separation and separate discharge of the constituents.

11. The process of separating a mixture of ingredients the heavier of which solidifies at a higher temperature, which comprises subjecting the mixture to a temperature which will maintain the lighter ingredient liquid and the heavier ingredient solid, subjecting said ingredients, at such temperatures and in such condition, together with a cushioning liquid of appropriate specific gravity, to the action of centrifugal force to effect the separation and separate discharge of the lighter ingredient and the separate discharge of the heavier ingredient with said cushioning liquid, effecting a partial removal of the cushioning liquid from the mixture of the heavier ingredient and such cushioning liquid, heating the mixture of such heavier ingredient and the unseparated cushioning liquid to liquefy the heavier ingredient, and subjecting the heated mixture to centrifugal force to effect the separation and separate discharge of the constituents.

In testimony of which invention, I have hereunto set my hand, at city of New York, on this 17th day of May, 1920.

CYRUS HOWARD HAPGOOD.